Patented Jan. 23, 1923.

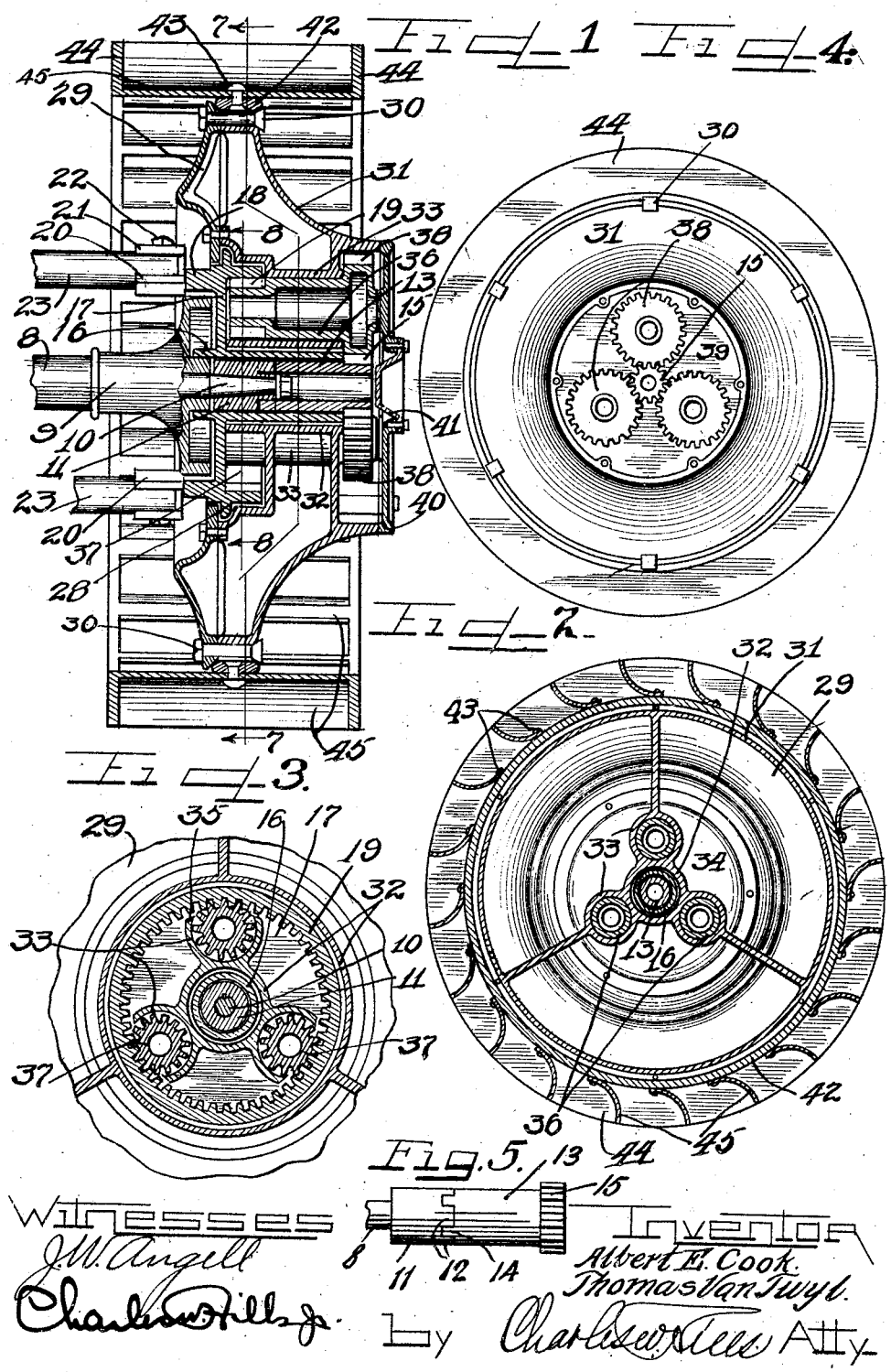

1,442,795

UNITED STATES PATENT OFFICE.

ALBERT E. COOK, OF EVANSTON, AND THOMAS VAN TUYL, OF KANKAKEE, ILLINOIS; SAID VAN TUYL ASSIGNOR TO SAID COOK.

VEHICLE SPEED-REDUCTION MECHANISM.

Application filed June 14, 1918. Serial No. 240,101.

*To all whom it may concern:*

Be it known that we, ALBERT E. COOK and THOMAS VAN TUYL, citizens of the United States, and residents of the city of Evanston, in the county of Cook and State of Illinois, and of the city of Kankakee, in the county of Kankakee and State of Illinois, have invented certain new and useful Improvements in a Vehicle Speed-Reduction Mechanism; and we do hereby declare that the following is a full, clear, and exact description of the same, reference being had to the accompanying drawings, and to the numerals of reference marked thereon, which form a part of this specification.

This invention pertains to an improved form of a speed reduction unit adapted to be removably attached upon the rear end of a motor driven vehicle, whereby a drive from the driving axles is transmitted through floating gears to tractor wheels at a reduced rate of speed.

It is also an object of the invention to construct a speed reduction driving mechanism adapted for use upon reapers, tractors and other forms of motor driven agricultural vehicles, whereby the speed of the driving wheels is reduced below the speed of the power driven shafts of the vehicle by balanced speed reduction gear mechanisms.

A further object of the invention is the construction of a driving unit, the wheels of which are driven at a rate of speed below that of the driving axles.

A further object of the invention is to provide a speed reduction demountable rim tractor wheel.

Other and further important objects of the invention will be apparent from the disclosures in the drawings and specification.

The invention (in a preferred form) is illustrated in the drawings and hereinafter more fully described.

On the drawings:—

Figure 1 is a fragmentary sectional view of a speed reduction wheel embodying the principles of this invention.

Figure 2 is a detail section on line 7—7 of Figure 1.

Figure 3 is a detail section on line 8—8 of Figure 1.

Figure 4 is an elevational view of the speed reduction wheel with the drum cover plate removed.

Figure 5 is a plan view of the geared clutch member of the device.

As shown on the drawings:—

The reference numeral 8 indicates a driving shaft or axle provided on its outer end with a housing 9, forming a part of the standard equipment, of an automobile. The tapered or reduced ends of the axle 8, is designated by the reference numeral 10, and extends through the hub of the housing. Keyed or otherwise secured upon the tapered end of the rear axle 8, to rotate therewith is a driving clutch member embracing a collar or bushing 11, provided with integral teeth 12, at the outer end. Said collar 11, is prevented from sliding on the tapered portion 10, of the axle by means of a nut threaded on the end of the axle as clearly shown in Figure 1. The outer portion of the clutch member comprises a sleeve or tube 13, the inner end of which is provided with a plurality of teeth 14, adapted to interfit with the teeth 12, whereby the sleeve 13, is axially aligned with the collar 11, and is rotated therewith, to permit a drive from the driving axle 8, to be transmitted to a pinion 15, integrally formed or rigidly secured upon the outer end of the clutch sleeve 13.

Engaged around the clutch member to the inside of the pinion 15, and also engaged around the hub of the housing 9, is a sleeve 16, of a stationary member provided with a plate 17, integral and at right angles to the sleeve 16, and disposed adjacent the open end of the housing 9. Integrally formed at right angles to the outer portion of the plate 17, is an inwardly directed flange ring 18, which is disposed around the drum portion of the housing 9, and also integrally formed at right angles to the outer margin of the plate 17, is an outwardly directed flange ring, the inner peripheral portion of which is formed to provide an integral internal annular gear 19. The stationary member is provided with a plurality of integral inwardly directed lugs or brackets 20, to each of which is rigidly secured by means of a clamping plate 21, and bolt 22, one end of a brace pipe or tube 23, the other end of each of said pipes being similarly secured to one of the brackets 20, of the stationary member disposed at the opposite side of the chassis, and forming a part of the speed reducing mechanism.

The stationary internal gear member 19 has a peripheral retaining flange 28, integrally formed on the ring flange, thereof. Disposed to the inside of the flange 28, is a centrally apertured inner or rear closure plate 29, which rotatably fits around the stationary member and has the inner and outer peripheral margins thereof provided with a plurality of apertures or openings to permit the closure plate to be rigidly secured by means of bolts 30, or other suitable means to close the inner end of a drum or housing 31, both ends of which are open. Integrally formed centrally within the drum 31, is a spider 32, provided with a plurality of parallel bearing or supporting cylinders or tubes 33, the inner ends of which extend beyond the rear wall 34, of the spider 32, and have a portion thereof cut away to afford peripheral openings 35. Rotatably disposed within each of the bearing cylinders 33, of the drum spider is a driving member embracing a cylinder 36, having integrally formed or rigidly secured on the inner end thereof a gear 37, which projects through the respective peripheral opening 35, one of which is provided in each of the bearing cylinders 33, to permit said gear to mesh with the stationary internal annular gear 19, as clearly shown in Figure 3. Integrally formed or rigidly secured on the outer end of each of the cylinders 36, is a gear 38, which is larger than the gear 37, and meshes with the driving pinion 15. The gears 38, are so disposed that the inner faces thereof are positioned adjacent a suitable abutment wall 39, of the drum 31, to limit the inward movement of the double geared driving members. To hold the double geared driving members in position within the drum spider and prevent an outward sliding movement thereof, an outer or front closure plate 40, is removably secured over the open outer end of the drum 31, which is provided with apertures to receive bolts for the purpose. The front closure plate 40, is centrally apertured and is closed by means of a plate 41, the central portion of which is depressed, as shown in Figure 1, for the purpose of holding the geared clutch member 13—15 in engagement with the clutch collar 11.

Rigidly but removably secured to the rim 42, of each of the drums 31, by bolts or rivets 43, is a tractor wheel, which may be of any desired type, but as shown, comprises two tread rings or flanges 44, parallel to one another and connected together by means of tread blades 45, through which the mounting bolts 43, engage.

The operation is as follows:—

The axle 8, rotates the pinioned clutches 11—13, through the inter-meshing clutch teeth 12—14, thereby rotating the driving pinions 15, at the same rate of speed as that of the axle 8. It will be noted that the driving pinion 15, is not provided with bearings and is held in balanced or floating position by means of the larger gears 38, of the double geared driving members. The balanced pinion 15, meshing with the double geared compensating drive members rotates said gears 38, and the cylinders 36, at a rate of speed which is less than that of the axle 8, said decrease in the speed of course depending upon the relative size of the pinion 15, and the gears 38. The inner gears 37, of the driving members are rotated simultaneously with the gears 38, and being in mesh with the stationary internal gear 19, said gears 37, travel around within said internal gear, whereby the spider 32, and the wheel drum 31, are rotated around the stationary members 16—19, thus driving the tractor wheel 44—45, at a rate of speed which is less than that of the differential driving axles 8.

As clearly shown in Figure 1, it will be noted that the internal gear member 19 is held stationary by means of brace rods or pipes 23, which are adapted to be clamped to the framework of a vehicle. It will be seen that the speed reducing tractor unit may be removably attached to practically any type of motor driven vehicle or farming machine, and that the double geared compensating drive members may be readily removed for replacement, cleaning or repairs by simply removing the outer drum closure plates 40, thus obviating the removal of the tractor wheel as a whole.

It will, of course, be understood that the speed reducing drum mechanism may be associated with any desired type of wheel other than that shown and described. We are further aware that numerous other details of construction may be varied through a wide range without departing from the principles of this invention and we therefore do not purpose limiting the patent granted otherwise than necessitated by the prior art.

We claim as our invention:

1. The combination with a driving axle and a wheel, of a clutch member secured on said axle, speed reduction gears in said wheel, a sleeve in said wheel, clutch teeth integrally formed on the inner end of said sleeve and interfitting with said clutch member, and a pinion integrally formed on the outer end of said sleeve meshing with said speed reduction gears.

2. A tractor wheel rim, a drum secured therein, a spider in said drum, cylindrical bearing members integrally formed on said spider and having openings therein, a non-rotatable internal gear associated with said spider, and double gear means in each of said spider bearing members and projecting through said openings to co-act with said internal gear whereby a drive transmitted to said double gear means is transmitted through said spider and drum to said wheel rim at a reduced rate of speed.

In testimony whereof we have hereunto subscribed our names in the presence of two subscribing witnesses.

ALBERT E. COOK.
THOMAS VAN TUYL.

Witnesses:
FRANK A. BREMER, Jr.,
FRED E. PAESLER.